United States Patent
Yang et al.

(10) Patent No.: US 12,073,603 B2
(45) Date of Patent: Aug. 27, 2024

(54) CLASSIFICATION METHOD AND ELECTRONIC APPARATUS

(71) Applicant: PEGATRON CORPORATION, Taipei (TW)

(72) Inventors: Chungfu Yang, Taipei (TW); Yuchi Liu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 413 days.

(21) Appl. No.: 17/687,458

(22) Filed: Mar. 4, 2022

(65) Prior Publication Data
US 2022/0343630 A1 Oct. 27, 2022

(30) Foreign Application Priority Data
Apr. 26, 2021 (TW) .................................. 110114851

(51) Int. Cl.
| | | |
|---|---|---|
| G06K 9/00 | (2022.01) | |
| G06V 10/762 | (2022.01) | |
| G06V 10/764 | (2022.01) | |
| G06V 10/77 | (2022.01) | |
| G06V 10/80 | (2022.01) | |
| G06V 10/82 | (2022.01) | |

(52) U.S. Cl.
CPC .......... *G06V 10/764* (2022.01); *G06V 10/762* (2022.01); *G06V 10/7715* (2022.01); *G06V 10/806* (2022.01); *G06V 10/82* (2022.01); *Y02P 90/30* (2015.11)

(58) Field of Classification Search
None
See application file for complete search history.

(56) References Cited

U.S. PATENT DOCUMENTS

| | | | |
|---|---|---|---|
| 8,705,875 B1 * | 4/2014 | Ricanek, Jr. ......... | G06V 40/172 382/203 |
| 9,177,230 B2 * | 11/2015 | Ricanek, Jr. ......... | G06V 40/172 |
| 9,946,948 B2 * | 4/2018 | Yazaki ................. | H04N 23/611 |
| 10,769,770 B2 * | 9/2020 | Wang .................. | H01M 8/2432 |
| 11,361,391 B2 * | 6/2022 | Ottnad ................. | G06F 16/387 |
| 11,727,553 B2 * | 8/2023 | Varga .................. | G06V 10/809 382/141 |
| 2019/0244309 A1 * | 8/2019 | Ottnad ................. | G06Q 50/04 |
| 2019/0340747 A1 * | 11/2019 | Wang .................. | H01M 8/2404 |

(Continued)

FOREIGN PATENT DOCUMENTS

| | | | |
|---|---|---|---|
| CN | 109615196 A | * | 4/2019 |
| CN | 110163084 | | 8/2019 |

(Continued)

*Primary Examiner* — Feng Niu
(74) *Attorney, Agent, or Firm* — J.C. PATENTS

(57) ABSTRACT

The disclosure provides a classification method and an electronic apparatus. The classification method includes the following steps. First feature data of multiple pictures of assembly is extracted, and each picture of assembly includes an operator at a station. The first feature data is converted into a first feature vector. Second feature data recording personal data of the operator is converted into a second feature vector. The first feature vector and the second feature vector are merged into a first feature matrix. The efficiency of the operator operating at the station is classified according to the first feature matrix to obtain a classification result.

10 Claims, 5 Drawing Sheets

(56) References Cited

U.S. PATENT DOCUMENTS

| | | | | |
|---|---|---|---|---|
| 2021/0142456 A1* | 5/2021 | Varga | ............... | G06V 30/19113 |
| 2021/0264161 A1* | 8/2021 | Saraee | ................ | G06F 18/2413 |
| 2022/0237943 A1* | 7/2022 | Wang | ................... | G06V 40/172 |

FOREIGN PATENT DOCUMENTS

| | | | | | |
|---|---|---|---|---|---|
| CN | 110796188 A | * | 2/2020 | ........... | G06K 9/6256 |
| CN | 111695747 | | 9/2020 | | |
| CN | 113205017 A | * | 8/2021 | | |

* cited by examiner

CLASSIFICATION METHOD AND ELECTRONIC APPARATUS

CROSS-REFERENCE TO RELATED APPLICATION

This application claims the priority benefit of Taiwan application serial no. 110114851, filed on Apr. 26, 2021. The entirety of the above-mentioned patent application is hereby incorporated by reference herein and made a part of this specification.

BACKGROUND

Technical Field

The disclosure relates to a classification method and an apparatus, and more particularly to a classification method and an electronic apparatus for operator assignment.

Description of Related Art

In production line management, station assignment for operators affects production capacity. Generally speaking, most operator assignment methods leverage historical data and design distribution logic according to business characteristics but cannot automatically update the distribution logic. Therefore, if the business changes or the time and space background changes, the original operator assignment methods will not be able to work effectively and affect production capacity. In addition, operator assignment methods established with machine learning models in the past require collection of correctly labeled data for analysis and training and thus tend to be limited by the number of samples when being used. Moreover, it is necessary that training via machine learning models rely on historical data to build effective prediction features for accurate prediction results. In light of this, the past operator assignment methods overly rely on structured data and are prone to cause problems such as inaccurate predictions or low relevance of features. In terms of method expansion, if traditional machine learning is to be applied to other scenarios, retraining another machine learning model is inevitable. Therefore, in the face of slight changes in prediction targets, it is necessary to design features and algorithm again, which makes it impossible to import machine learning models efficiently and rapidly.

SUMMARY

The disclosure provides a classification method and an electronic apparatus, which may effectively predict working efficiency of each operator at each station.

The classification method of the disclosure includes the following steps. First feature data of multiple pictures of assembly is extracted, and each picture of assembly includes an operator at a station. The first feature data is converted into a first feature vector. Second feature data recording personal data of the operator is converted into a second feature vector. The first feature vector and the second feature vector are merged into a first feature matrix. The efficiency of the operator operating at the station is classified according to the first feature matrix to obtain a classification result.

The electronic apparatus for operator classification of the disclosure includes a storage and a processor. The storage stores at least one code fragment, multiple pictures of assembly, and personal data of an operator. The processor is coupled to the storage and is configured to execute the at least one code fragment to implement the classification method.

Based on the above, the disclosure may solve the dilemma that it is difficult to find effective features with only structured data in the past, and may make predictions according to a variety of data, thereby improving accuracy of final results.

DESCRIPTION OF THE EMBODIMENTS

Figure 1:
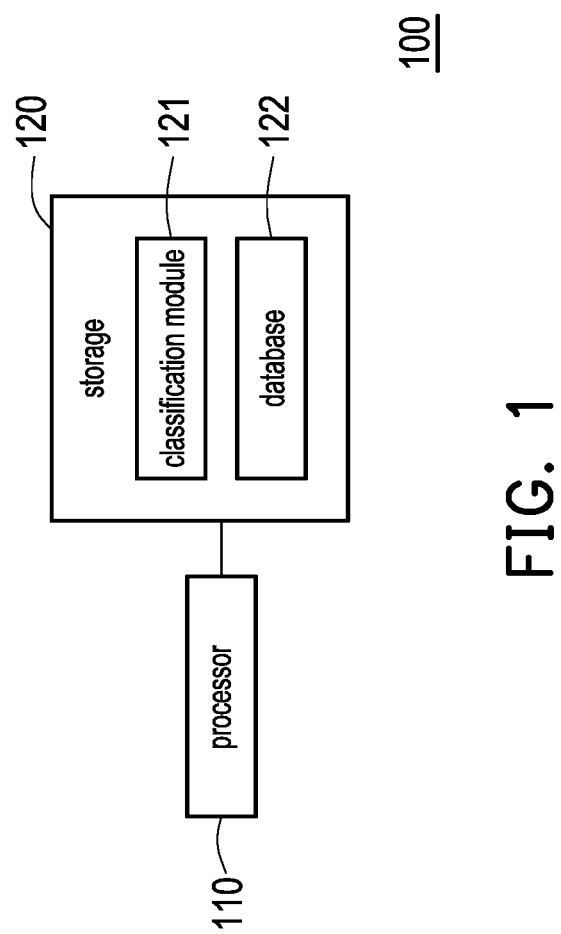
FIG. 1 is a block diagram of an electronic apparatus according to an embodiment of the disclosure.

FIG. 1 is a block diagram of an electronic apparatus according to an embodiment of the disclosure. With reference to FIG. 1, an electronic apparatus 100 includes a processor 110 and a storage 120. The processor 110 is coupled to the storage 120.

The processor 110 is, for example, a central processing unit (CPU), a physics processing unit (PPU), a programmable microprocessor, an embedded control chip, a digit signal processor (DSP), an application specific integrated circuit (ASIC), or other similar apparatuses.

The storage 120 is, for example, any type of fixed or mobile random access memory (RAM), read-only memory (ROM), flash memory, hard disk, other similar apparatuses, or a combination of these apparatuses. The storage 120 stores multiple code fragments, and the code fragments are executed by the processor 110 after installed. For example, the storage 120 includes a classification module 121. The classification module 121 is composed of one or more code fragments to be executed by the processor 110 for implementing the classification method.

The storage 120 further includes a database 122. The database 122 stores multiple yield data and multiple historical data of multiple operators at the same station or at different stations corresponding to different dates. These historical data include respective personal data of the operators and historical pictures taken when the operators are performing assembly operations at the stations. The processor 110 clusters the operators according to the yield data stored in the database 122 and then gives each operator an efficiency label (such as "good", "middle", or "bad") at different time points. Afterwards, the efficiency labels of the operators corresponding to different dates and the historical data of the operators are used to train the classification module 121, and then the classification module 121 is used for subsequent predictions.

For example, according to multiple yield data, the processor 110 may cluster the corresponding operators into multiple groups via K-means algorithm, with each group corresponding to one efficiency label. Here, assuming that the number of the efficiency labels is 3, including "good", "middle", and "bad", the K value of the K-means algorithm is set to 3 for clustering, such that a group of people with high failure rates is defined as "bad", a group of people with middle failure rates is defined as "middle", and a group of people with low failure rates is defined as "good". In this way, the efficiency label of each operator at one station per day is marked as shown in Table 1. Table 1 records the personal data and the efficiency label at a certain station on a certain day of each operator.

TABLE 1

| operator | recording date | gender | age | ... | efficiency label |
|---|---|---|---|---|---|
| A | ... | female | 25 | ... | good |
| B | ... | male | 24 | ... | middle |
| C | ... | male | 30 | ... | bad |
| . | . | . | . | ... | . |
| . | . | . | . |  | . |
| . | . | . | . |  | . |

Figure 2:
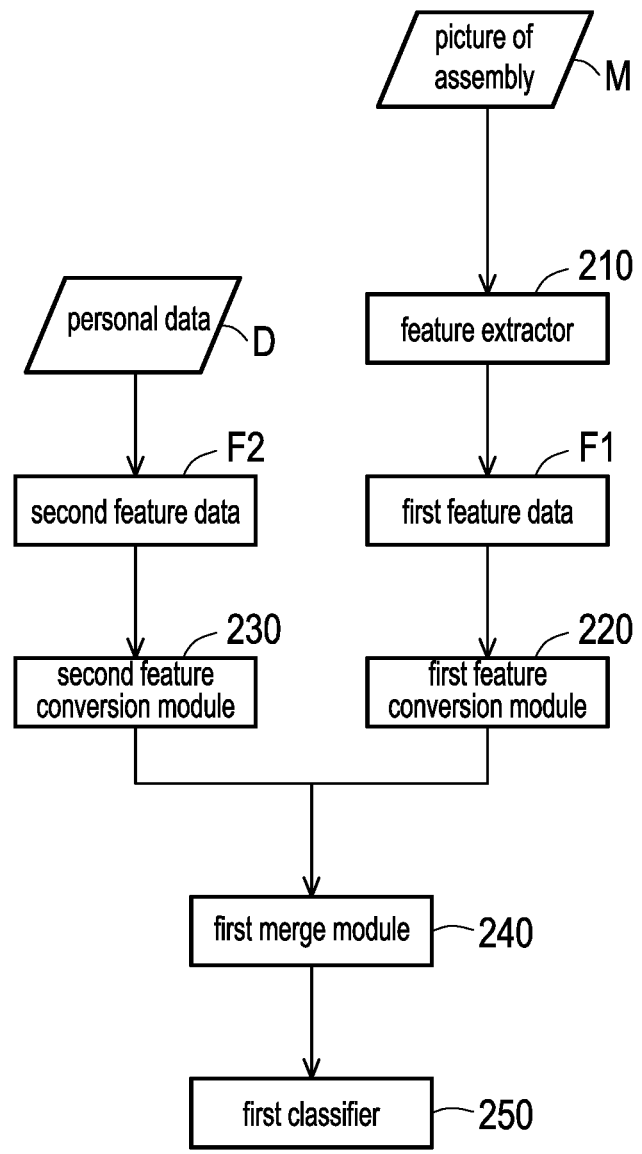
FIG. 2 is a structural diagram of a classification module according to an embodiment of the disclosure.

After the efficiency label of each operator is marked, the historical data corresponding to each operator may be further used to train the classification module 121. For example, FIG. 2 is a structural diagram of a classification module according to an embodiment of the disclosure. In this embodiment, the classification module 121 uses a feature extractor 210 to extract features from multiple pictures of assembly M and integrate the features into a first feature data F1. Here, these pictures of assembly M are the historical pictures stored in the storage 120. These pictures of assembly M are obtained by recording an image stream when the operator A is performing assembly operation at a station and then extracting multiple continuous image frames in the image stream as the pictures of assembly M. In some other embodiments, the pictures of assembly M may also be pictures taken at different time points when the operator A is performing assembly operation at the station (for example, before assembly, during assembly, and after assembly). The purpose of using the pictures of assembly M to extract features and integrating the features into the first feature data F1 lies in that these pictures of assembly M may represent some assembly habits, assembly postures, assembly sequence, or assembly efficiency of the operator A during assembly.

Here, it is assumed that multiple pictures of assembly M and personal data D of the operator A marked with one efficiency label as shown in Table 1 are used as input data. Here, the pictures of assembly M and the personal data D are stored in the storage 120. The personal data D includes gender, seniority, accommodation, eyesight, production line station, recording date, age, assembly yield rate, and the like. Second feature data F2 is obtained after the personal data D is digitized. After the first feature data F1 and the second feature data F2 are obtained, feature conversion is performed respectively on the first feature data F1 and the second feature data F2 by a first feature conversion module 220 and a second feature conversion module 230. Then, a first merging module 240 performs a merge operation and inputs the merged result to a first classifier 250 to obtain scores corresponding to multiple efficiency labels, and the efficiency label corresponding to the highest score is used as the final classification result. In following, the final classification result is compared with the pre-marked efficiency labels to adjust parameters and/or weights in the first classifier 250 of the classification module 121.

Figure 3:
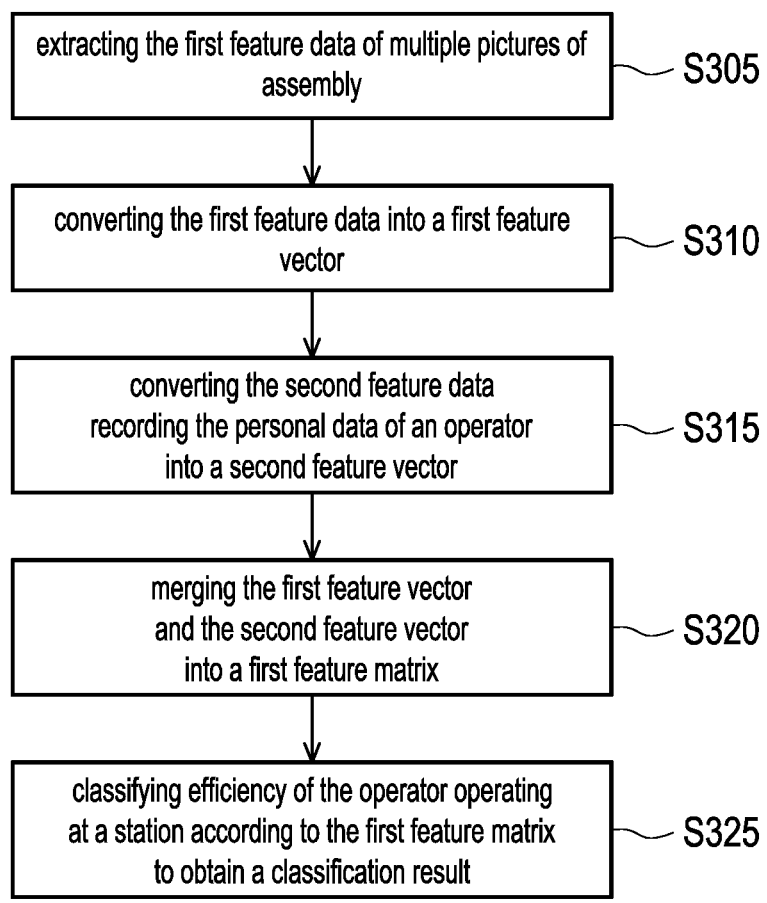
FIG. 3 is a flowchart of a classification method according to an embodiment of the disclosure.

FIG. 3 is a flowchart of a classification method according to an embodiment of the disclosure. With reference to FIG. 3, in step S305, the first feature data F1 of multiple pictures of assembly M is extracted. Here, the feature extractor 210 is used to obtain the first feature data F1 from the pictures of assembly M. The feature extractor 210 may be implemented by a trained autoencoder. For example, multiple pictures of assembly of each operator are input for restoring and reconstructing graphics via deep learning to train the autoencoder, and features of the input pictures of assembly for reconstruction are extracted as the first feature data. In addition, the feature extractor 210 may also include a feature detector of a convolutional neural network (CNN). Generally speaking, a convolutional layer of the CNN may obtain a feature map by the feature detector (also referred to as a convolutional kernel or a filter).

Next, in step S310, the first feature data F1 is converted into a first feature vector. For example, the first feature conversion module 220 includes a flatten function, a fully connected (FC) function, and an activation function. First, the first feature data F1 is flattened with the flatten function, which means the multi-dimensional first feature data F1 is transformed into a one-dimensional matrix. Next, the one-dimensional matrix is input to the fully connected function to obtain a feature vector by adjusting the weight and deviation. In following, the feature vector is input to the activation function to obtain the first feature vector.

Here, the fully connected function refers to the processing method of a fully connected layer of a neural network. The fully connected function is, for example, matrix multiplication, which is equivalent to feature-space transformation. For example, affine transformation is performed on input data by using the fully connected function to linearly transform one vector space to another vector space, extracting and integrating useful information. The activation function may be a rectified linear unit (ReLU) function, such as a ramp function, to enhance nonlinear characteristics.

In step S315, the second feature data F2 recording the personal data D of an operator is converted into a second feature vector. For example, the second feature conversion module 230 includes the fully connected function and the activation function. The fully connected function is used to linearly transform one vector space to another vector space, and then the activation function (such as the ReLU function) is used to enhance the nonlinear characteristics.

Afterwards, in step S320, the first feature vector and the second feature vector are merged into a first feature matrix. Here, the first merge module 240 includes a concat function, the fully connected function, and the activation function. The concat function is used to merge the first feature vector and the second feature vector into one matrix, and then the fully connected function is used to linearly transform one vector space of the matrix to another vector space, and the activation function (such as the ReLU function) is further used to enhance the nonlinear characteristics. In this way, the first feature matrix is obtained.

In following, in step S325, the efficiency of the operator operating at a station is classified according to the first feature matrix to obtain a classification result. Specifically, the first feature matrix is input to the first classifier 250 to obtain the classification result. The first classifier 250 obtains scores of the operator corresponding to multiple efficiency labels according to the input first feature matrix. Here, the first classifier 250 may be implemented by the fully connected function. In this embodiment, multiple fully connected layers (the fully connected functions) are used, in which the last fully connected layer serves as a classifier and the other fully connected layers serve to extract features. Next, the processor 110 compares the classification result of the first classifier 250 with the pre-marked efficiency labels to adjust parameters and/or weights in the first classifier 250 of the classification module 121. After the training is completed, data corresponding to unlabeled operators may be classified by using the first classifier 250.

In another embodiment, the classification module 121 may further be implemented by two different feature extractors and two different classifiers as exemplified hereinafter.

Figure 4:
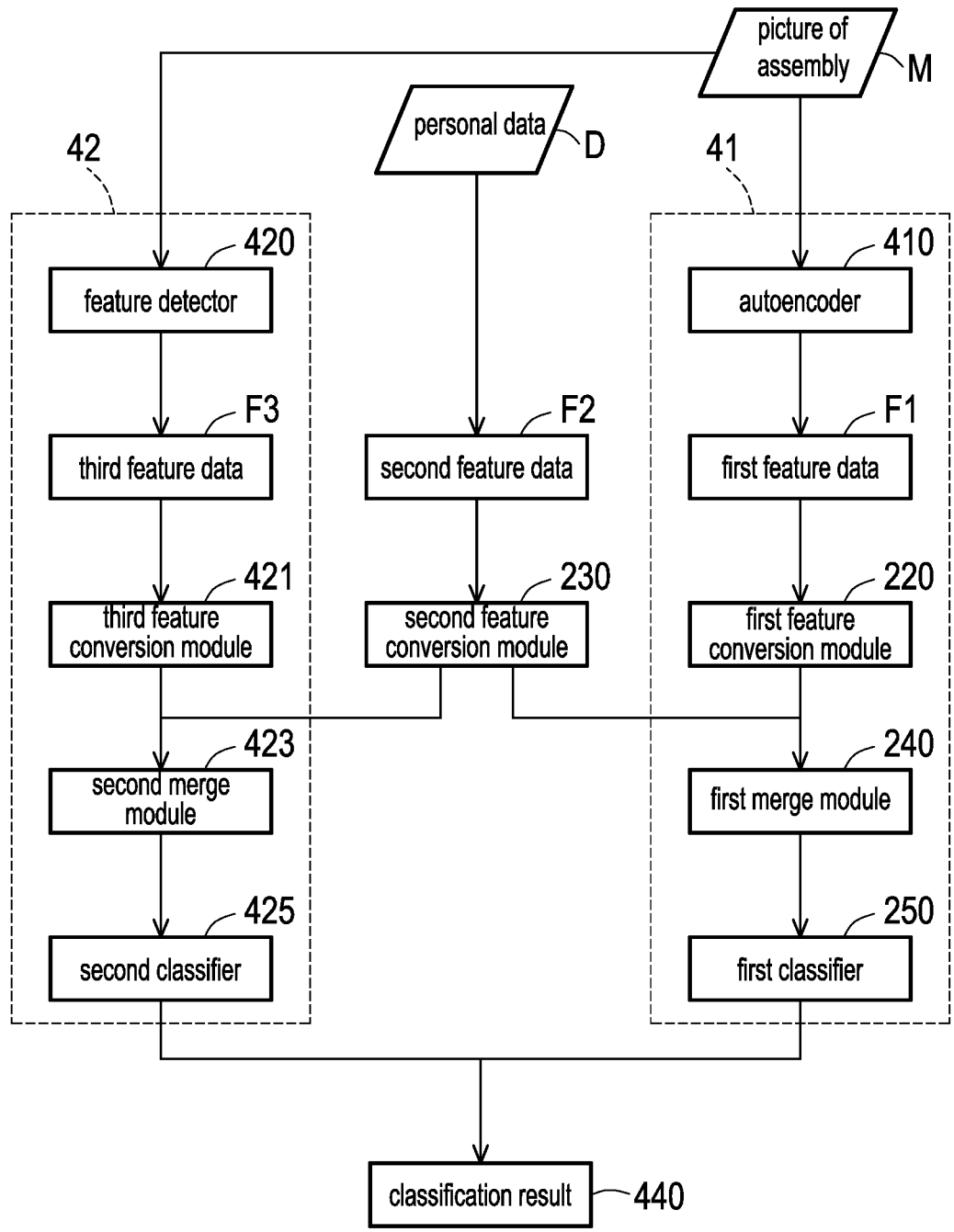
FIG. 4 is a structural diagram of a classification module according to an embodiment of the disclosure.

FIG. 4 is a structural diagram of a classification module according to an embodiment of the disclosure. In this embodiment, the classification module 121 uses two analysis modules 41 and 42. The analysis module 41 includes an autoencoder 410, the first feature conversion module 220, the first merge module 240, and the first classifier 250. The analysis module 42 includes a feature detector 420, a third feature conversion module 421, a second merge module 423, and a second classifier 425. Other elements with the same reference numbers represent elements having the same effects. Here, the autoencoder 410 needs to be trained in advance before used, and the feature detector 420 may adjust its internal parameters during the training process of the first classifier 250 of the classification module 121.

In the analysis module 41, the first feature data F1 is extracted from multiple pictures of assembly M corresponding to an operator marked with the efficiency label by the autoencoder 410. After the first feature data F1 is obtained, the first feature data F1 is converted into the first feature vector by the first feature conversion module 220. In following, the first feature vector and the second feature vector are merged by the first merge module 240 to obtain the first feature matrix, and the merged first feature matrix is input to the first classifier 250 to obtain first scores corresponding to multiple efficiency labels. In other words, one efficiency label has one corresponding first score.

On the other hand, in the analysis module 42, third feature data F3 is extracted from multiple pictures of assembly M corresponding to an operator marked with the efficiency label by the feature detector 420. After the third feature data F3 is obtained, the third feature data F3 is converted into a third feature vector by the third feature conversion module 421. Here, the third feature conversion module 421 is similar to the first feature conversion module 220. In following, the third feature vector and the second feature vector are merged by the second merge module 423 to obtain a second feature matrix, and the merged second feature matrix is input to the second classifier 425 to obtain second scores corresponding to multiple efficiency labels. In other words, one efficiency label has one corresponding second score.

Finally, the final classification result 440 is obtained based on the first scores obtained by the first classifier 250 and the second scores obtained by the second classifier 425. For example, the classification result 440 records that the efficiency label of "good" scores 0.7, the efficiency label of "middle" scores 0.2, and the efficiency label of "bad" scores 0.1.

For example, Table 2 shows the first scores and the second scores corresponding to different efficiency labels and weights corresponding thereto. The size of the weight may be determined based on the importance of the feature extractor. The higher the importance, the greater the weight.

TABLE 2

| efficiency label | first score | second score |
|---|---|---|
| good | A1 | B1 |
| middle | A2 | B2 |
| bad | A3 | B3 |
| weight | W1 | W2 |

For example, a composite score for an efficiency label of "good" is $S_{good}=A1 \times W1+B1 \times W2$, a comprehensive score for an efficiency label of "middle" is $S_{middle}=A2 \times W1+B2 \times W2$, and a comprehensive score for an efficiency label of "bad" is $S_{bad}=A3 \times W1+B3 \times W2$. Afterwards, the efficiency label corresponding to the highest one among the comprehensive scores is taken as the final classification result.

In other embodiments, three or more feature extractors, feature conversion modules, merge modules, and classifiers may further be used.

Figure 5:
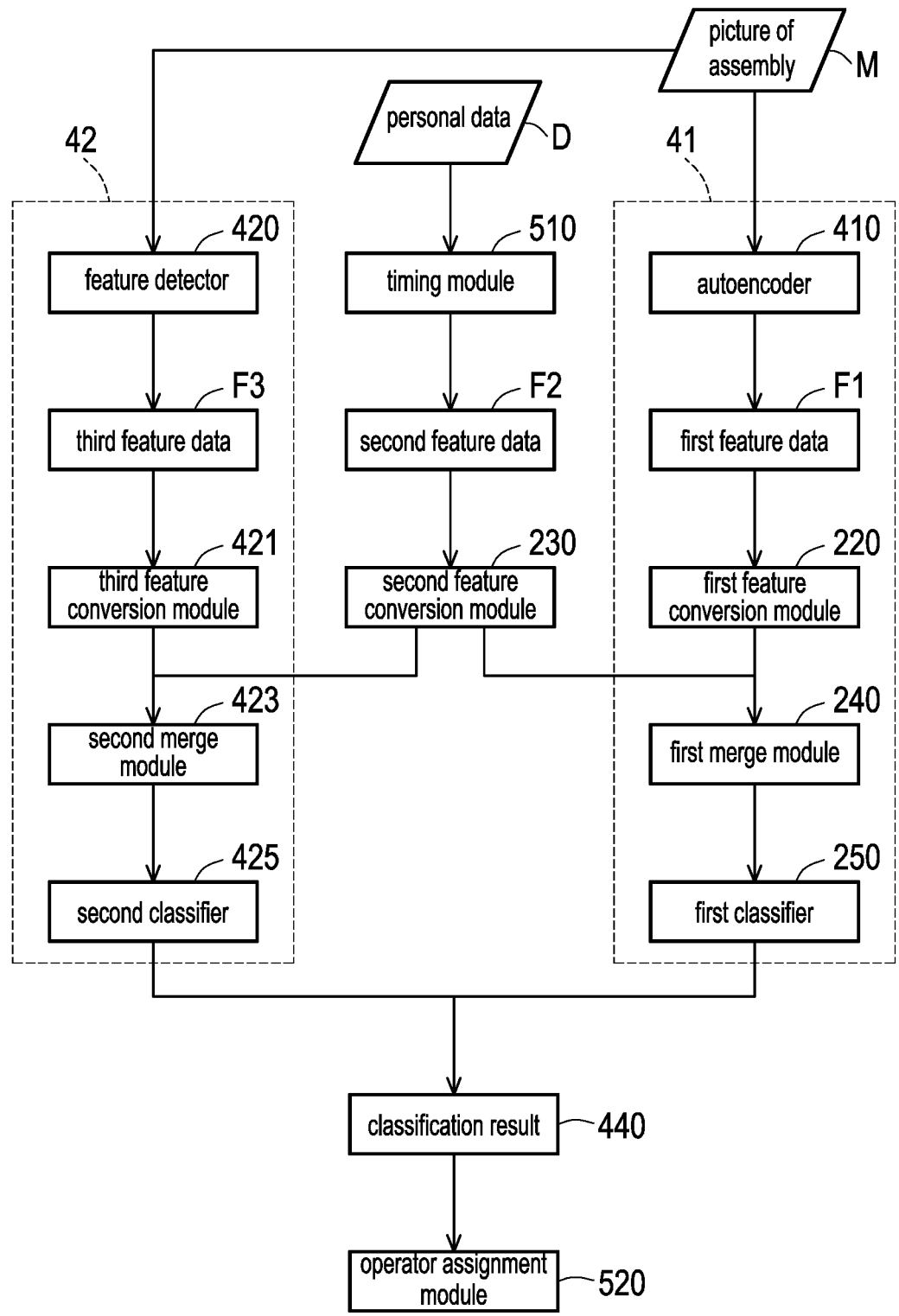
FIG. 5 is a structural diagram of a classification module according to an embodiment of the disclosure.

FIG. 5 is a structural diagram of a classification module according to an embodiment of the disclosure. With reference to FIG. 5, this embodiment is roughly the same as the structure shown in FIG. 4, and the difference lies in that the structure shown in FIG. 5 further includes a timing module 510 and an operator assignment module 520. In this embodiment, a specified time range for predicting work efficiency of an operator may further be set, such that changes in the personal data D may be predicted within the specified time range by the timing module 510, and the second feature data F2 may be extracted based on the predicted personal data D. For example, assuming that the specified time range is 90 days in the future, changes in the personal data D for each day in the next 90 days is predicted by the timing module 510, such as whether the operator is still working, whether the operator continues to live in accommodation, or the like. In following, the classification results of the operator in each station for each day in the next 90 days (scores for the efficiency labels of "good", "middle", and "bad") are predicted the classification module 121. After that, operators are assigned by the operator assignment module 520 for the best personnel assignment. The operator assignment module 520 uses linear programming algorithm to assign each operator to the best station.

For example, a classification result of an operator $U_{01}$ at a station $Sta_{01}$ for each day in the next 90 days is predicted by the classification module 121, and an efficiency score is given based on the classification result. For example, the efficiency scores corresponding to the efficiency labels "good", "middle", and "bad" are 0, 1, and 2, respectively. As shown in Table 3, assuming that the efficiency score is 0 as the classification result on Day 1 is "good", the efficiency score is 2 as the classification result on Day 2 is "bad", the efficiency score is 1 as the classification result on Day 3 is "middle", and so on, then the efficiency score corresponding to the classification result on Day 90 is 1. Next, the predicted results for 90 days are summed up to obtain a prediction score as $Score(Sta_{01}, U_{01})$.

TABLE 3

| station $Sta_{01}$; operator $U_{01}$ | | |
|---|---|---|
| day in the future | classification result | efficiency score |
| Day 1 | good | 0 |
| Day 2 | Bad | 2 |
| Day 3 | middle | 1 |
| . | . | . |
| . | . | . |
| . | . | . |
| Day 90 | middle | 1 |
| prediction score | $Score(Sta_{01}, U_{01}) = 0 + 1 + 2 \ldots + 1$ | |

In the same way, the prediction scores of multiple operators at multiple different stations are calculated by the classification module 121. After the predicted score of each operator at each station is obtained, operators may be further assigned according to the numbers of required people at these stations with the lowest assignment score obtained by summing up the predicted scores of these operators after assignment.

For example, assuming that the total number of required people for the station $Sta_{01}$ and a station $Sta_{02}$ is 4, and the total number of required people for a station $Sta_{03}$ and a station $Sta_{04}$ is 2, then the station $Sta_{01}$ currently has two positions that may be assigned, the station $Sta_{02}$ currently has six positions that may be assigned, the station $Sta_{03}$ currently has eight positions that may be assigned, and the station $Sta_{04}$ currently has three positions that may be assigned.

Table 4 below shows which station each operator is to be assigned to, and values of $X_1$ to $X_i$ are 1 or 0. A value of 1 means an operator is assigned to the corresponding station, while a value of 0 means an operator is not assigned to the corresponding station. Taking the operator $U_{01}$ for description, when the operator $U_{01}$ is assigned to the station Stan, the value of $X_1$ is 1, and the values of $X_2$, $X_3$, and $X_4$ are all 0. In other words, when the value of one of $X_1$, $X_2$, $X_3$, and $X_4$ is 1, the values of the other three are all 0.

TABLE 4

| operator | Sta01 | Sta02 | Sta03 | Sta04 |
|---|---|---|---|---|
| $U_{01}$ | $X_1$ | $X_2$ | $X_3$ | $X_4$ |
| $U_{02}$ | $X_5$ | $X_6$ | $X_7$ | $X_8$ |
| $U_{03}$ | $X_9$ | $X_{10}$ | $X_{11}$ | $X_{12}$ |
| $U_{j-1}$ | $X_{i-7}$ | $X_{i-6}$ | $X_{i-5}$ | $X_{i-4}$ |
| $U_j$ | $X_{i-3}$ | $X_{i-2}$ | $X_{i-1}$ | $X_i$ |

Based on the positions currently available for assigned and the number of required people at each station, the following conditions are set:

$$SUM_{01}=X_1+X_5+X_9+\ldots+X_{i-7}+X_{i-3}\leq 2;$$

$$SUM_{02}=X_2+X_6+X_{10}+\ldots+X_{i-6}+X_{i-2}\leq 6;$$

$$SUM_{03}=X_3+X_7+X_{11}+\ldots+X_{i-5}+X_{i-1}\leq 8;$$

$$SUM_{04}=X_4+X_8+X_{12}+\ldots+X_{i-1}+X_i\leq 3;$$

$$SUM_{01}+SUM_{02}=4;$$

$$SUM_{03}+SUM_{104}=2.$$

Among the above, $SUM_{01}$ represents the total number of people assigned at the station $Sta_{01}$, $SUM_{02}$ represents the total number of people assigned at the station Stain, $SUM_{03}$ represents the total number of people assigned at the station $Sta_{03}$, and $SUM_{04}$ represents the total number of people assigned at the station $Sta_{04}$. Based on the respective positions currently available for assignment at the stations $Sta_{01}$ to $Sta_{04}$, it is set that $SUM_{01}\leq 2$, $SUM_{02}\leq 6$, $SUM_{03}\leq 8$, and $SUM_{04}\leq 3$. In addition, based on the numbers of required people (the total number of required people for the station $Sta_{01}$ and the station $Sta_{02}$ is 4, and the total number of required people for the station Sta03 and the station Sta04 is 2), it is set that $SUM_{01}+SUM_{02}=4$ and $SUM_{03}+SUM_{04}=2$.

With the above conditions, the predicted score of each operator at each station is used to obtain the best personnel assignment. In other words, the smaller the assignment score finally obtained, the better the effect that may be obtained.

In addition, if data of new operators at new stations in the production line appear in the future, there is no need to use all the data to retrain the entire model architecture, and the pros and cons of each operator at a new station may be predicted merely with a small amount of data at each station provided for updating and training the model.

To sum up, the disclosure may cluster historical data based on the pros and cons thereof, give each piece of the historical data an efficiency label, extract features in pictures of assembly of each operator by the feature extractor, and integrate the features with past historical data to solve the dilemma that it is difficult to find effective features with only structured data in the past. In addition, after training, the results of multiple models are integrated for predictions to distinguish the pros and cons of each operator, and finally through the linear programming method, outstanding operators are prioritized to be assigned to suitable stations.

What is claimed is:

1. A classification method, comprising:
    extracting first feature data of one of a plurality of pictures of assembly, wherein each of the plurality of pictures of assembly comprises an operator located at a station;
    converting the first feature data into a first feature vector;
    converting second feature data recording personal data of the operator into a second feature vector;
    merging the first feature vector and the second feature vector into a first feature matrix; and
    classifying efficiency of the operator operating at the station according to the first feature matrix to obtain a classification result.

2. The classification method according to claim 1, before the step of extracting the first feature data of the plurality of pictures of assembly, further comprising:
    recording an image stream during assembly operation of the operator at the station; and
    extracting a plurality of continuous image frames in the image stream as the plurality of pictures of assembly.

3. The classification method according to claim 1, wherein the step of extracting the first feature data corresponding to the plurality of pictures of assembly comprises:
    extracting the first feature data corresponding to the plurality of pictures of assembly by a feature extractor, wherein the feature extractor comprises an autoencoder or a feature detector of a convolutional neural network.

4. The classification method according to claim 1, after classifying the efficiency of the operator operating at the station, the classification method further comprising:
    obtaining a plurality of first scores of the operator corresponding to a plurality of efficiency labels; and
    determining one with the highest first score among the plurality of efficiency labels as the classification result.

5. The classification method according to claim 4, further comprising:
    extracting third feature data of one of the plurality of pictures of assembly, wherein the first feature data is different from the third feature data;
    converting the third feature data into a third feature vector;
    merging the third feature vector and the second feature vector into a second feature matrix;
    classifying the plurality of efficiency labels of the operator according to the second feature matrix to obtain a plurality of second scores; and
    obtaining the classification result corresponding to the efficiency of the operator operating at the station according to the plurality of first scores and the plurality of second scores.

6. The classification method according to claim 1, wherein the step of converting the first feature data into the first feature vector comprises:

converting the first feature data into the first feature vector by a flatten function, a fully connected function, and an activation function.

7. The classification method according to claim 1, wherein the step of classifying the efficiency of the operator operating at the station comprises:
classifying the efficiency according to the first feature matrix by a classifier;
wherein the classification method further comprising:
clustering a plurality of yield data of a plurality of operators at the station corresponding to different dates by a clustering algorithm to obtain an efficiency label of the plurality of operators corresponding to each time point; and
training the classifier by the efficiency label corresponding to each of the plurality of operators at each time point and a plurality of historical data of each of the plurality of operators, wherein each of the plurality of historical data comprises the personal data of each of the plurality of operators and historical pictures taken during assembly operation at the station.

8. The classification method according to claim 1, wherein the personal data comprises gender, seniority, accommodation, eyesight, production line station, recording date, age, assembly yield, or any combination thereof.

9. The classification method according to claim 1, before the step of converting the second feature data recording the personal data of the operator into the second feature vector, further comprising:

predicting change in the personal data within a specified time range by a timing module, and determining the personal data based on prediction as the second feature data.

10. An electronic apparatus for operator classification, comprising:
a storage, storing at least one code fragment, a plurality of pictures of assembly, and personal data of an operator; and
a processor, coupled to the storage and configured to execute the at least one code fragment to implement:
extracting first feature data of one of the plurality of pictures of assembly, wherein each of the plurality of pictures of assembly comprises the operator located at a station;
converting the first feature data into a first feature vector;
converting second feature data recording the personal data into a second feature vector;
merging the first feature vector and the second feature vector into a first feature matrix; and
classifying efficiency of the operator operating at the station according to the first feature matrix to obtain a classification result.

\* \* \* \* \*